Aug. 30, 1927.
C. F. BRAUN
1,640,747
ABSORPTION PLANT
Filed Feb. 7, 1923
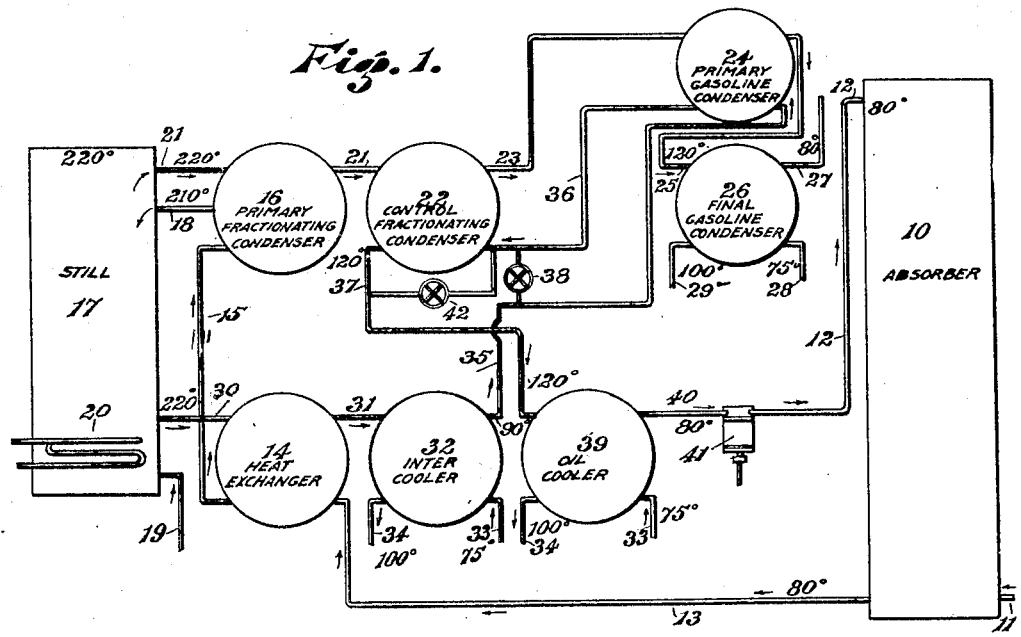
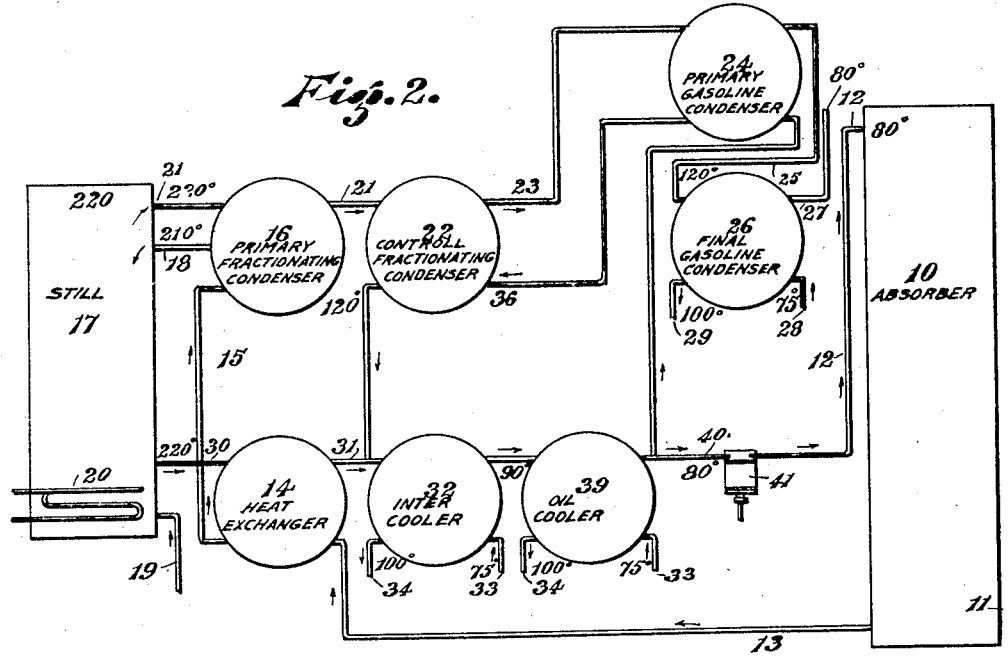
INVENTOR.
CARL. F. BRAUN.
BY Dewey, Strong,
Townsend & Loftus.
ATTORNEYS.

Patented Aug. 30, 1927.

1,640,747

UNITED STATES PATENT OFFICE.

CARL F. BRAUN, OF PASADENA, CALIFORNIA.

ABSORPTION PLANT.

Application filed February 7, 1923. Serial No. 617,494.

This invention relates to an absorption plant and a method of operating the same.

It is the principal object of the present invention to provide an absorption plant arrangement, particularly adapted for the recovery of gasoline from casing head gas, which plant is decidedly economical in its operation, and permits the advantageous use of denuded oil to oil and of oil to water heat exchangers, thereby eliminating a considerable amount of expensive equipment, and at the same time facilitating in the recovery of gasoline or like products, it being understood that the plant is applicable for other uses than when acting upon casing head gases, and that in any event, the heat exchangers operate in a manner to insure that proper exchange of heat will be made, without the production of scale in the water circulating conduits of the apparatus, and without necessitating the use of other cooling mediums save the denuded oil produced incidental to the distillation and absorption operations.

It is an additional object of the present invention to provide means for insuring that the cooling medium will be maintained in a stable condition, for when water is used at high temperature in condensing and cooling apparatus, it is usually difficult to regulate the temperature of the cooling or condensing surfaces when this temperature is above the boiling temperature of the water, as this permits great fluctuation of temperature caused by vaporization of a portion of the water.

The present invention contemplates the use of an absorption tower, a still, and intermediate heat exchangers, through which a flow of saturated oil, denuded oil and water may be brought about and controlled in a manner to remove a desired product from the saturated oil, while varying its temperature as controlled by the interflow of denuded and saturated oil through heat exchangers, and the flow of water through certain other heat exchangers.

The invention is illustrated by way of example in the accompanying drawings, in which:

Fig. 1 is a view in diagram showing the schematic arrangement of the absorption plant embodying a more complicated arrangement of the present invention, whereby more efficient results may be obtained.

Fig. 2 is a view in diagram showing an alternate form of absorption plant, operating on the general plan of that disclosed in Fig. 1.

Referring more particularly to Fig. 1, 10 indicates an absorption tower, to the bottom of which casing head gas obtained from oil wells and the like is delivered through a pipe 11, and passes upwardly through the absorber. An absorption oil having boiling points above those of gasoline is pumped into the top of the absorber tower through a pipe 12, and is permitted to flow downwardly through the tower, passing over and around obstructions which bring it into intimate contact with the upwardly flowing casing head gas. This absorption oil is drawn off at the bottom of the absorber through a pipe 13 and in the form of a saturated oil is carried to a heat exchanger 14. This saturated oil contains various amounts of gasoline which have been absorbed from the gas while passing through the tower, and it is very common for the gasoline content of the oil to equal 4% by weight of the amount of oil drawn from the tower. The saturated oil, after passing through heat exchanger 14 is then conducted through a conduit 15 to a heat exchanger 16, during which time its temperature is raised, and after which it is delivered to the top of a vertical still 17 through a conduit 18. This saturated oil containing the gasoline flows into the still at a comparatively high temperature, at which time steam is injected into the bottom of the still through the pipe 19, the quantity of steam frequently amounting to from 50% to 100% by weight of the gasoline to be distilled off. A steam heating coil 20 is mounted within the still to increase the temperature in the vaporizing space.

Due to the increased temperature of the saturated oil delivered to the still and the action produced by the reduced partial pressure of the gasoline vapors because of the injected steam, the gasoline will pass off from the still as a vapor through outlet pipe 21, where it is condensed and cooled by some cooling medium such as water. In the arrangement shown in Fig. 1, it is noted that the gasoline vapors pass through the heat exchanger 16, said exchanger also being in the path of flow of the saturated oil as it travels to the still. The vapors passing from pipe 21 to the primary fractionating condenser 16 will be cooled as they pass through this condenser and will successively pass through the control fractionating condenser 22, thence along pipe 23 to the primary section 24 of the gasoline condenser and then along pipe 25 to the final section 26 of the gasoline condenser, after which the condensed vapors will be drawn away to a storage tank through a pipe 27. The final condenser is cooled by water as a cooling medium which passes into the condenser through pipe 28 and passes out through a pipe 29. During this operation the denuded oil is being drawn from the bottom of the still 17 and is then passed through pipe 30 to the heat exchanger 14, where a portion of the heat from the denuded oil will be imparted to the saturated oil flowing to the still. The denuded oil will then pass through a pipe 31 to oil intercooler 32 and will then pass through pipe 35 to the primary section 24 of the gasoline condenser. Attention is directed to the fact that after the denuded oil has passed through the intercooler 32 its temperature will be appreciably lower than when it left the heat exchanger and it is one of the important features of the present invention to then take the denuded oil and use it as a cooling medium during which time its temperature will rise, and after which its temperature may again be lowered to a temperature suitable for its delivery to the absorption tower. This is brought about by circulating the denuded oil through pipe 35 to the primary section 24 of the gasoline condenser, after which it is carried to control condenser 22 by pipe 36. In these two condensers the denuded oil will tend to cool the hot vapors which have been drawn from the still, and at the same time the temperature of the denuded oil will rise. This oil will then be conducted through pipe 37 to an oil cooler 39, thereafter passing through pipe 40 to a pump 41 and then returning to the absorber 10 through pipe 12. The coolers 32 and 39 as indicated in Fig. 2 are cooled by water which flows through the coolers, entering by pipes 33 and leaving by pipes 34. The operation of the apparatus shown in Fig. 2 is slightly modified as compared with the arrangement shown in Fig. 1, although the same idea is carried out, to wit, that an exchange of heat is brought about at different points in the apparatus and between saturated and denuded oil or some other menstruum, and that a final exchange of heat takes place between the denuded menstruum and water at a temperature below the scaling temperature of the water. Referring more particularly to Fig. 2, it will be seen that the saturated oil passes from the tower 10 through pipe 13, thereafter passing through heat exchanger 14 where it flows in heat exchange relationship to denuded oil passing from the still 17, the result being that the temperature of the saturated oil will be raised and the temperature of the denuded oil will be lowered. The saturated oil then passes along pipe 15 to the primary fractionating condenser 16 and thereafter passes through the still at a relatively high temperature through pipe 18. In the primary fractionating condenser the saturated oil passes in heat exchange relationship to the hot vapors passing from the still 17, with the result that the vapors will be slightly cooled and the temperature of the saturated oil will be raised prior to delivery of this oil to the still. The vapors passing from the still through pipe 21 will after flowing through the primary fractionating condenser 16 then flow through the control fractionating condenser 22, after which these vapors will pass successively through the gasoline condenser 24 and the final condenser 26. The denuded oil which has been drawn off from the bottom of the still 17 passes successively through heat exchanger 14, oil intercoolers 32 and 39, which intercoolers are water cooled, and then through gasoline condensers 24 and the control fractionating condenser 22, thereafter flowing through the intercoolers and being drawn off to the tower 10 by the pump 41. By this means it will be seen that the denuded oil after having been cooled through the intercoolers, will cool the gaseous vapors flowing through the control fractionating condenser and the gasoline condenser and will permit final condensation of the vapors to be effected in the final condenser 26 where water is used as a cooling medium.

It will be seen that the process here employed is a continuous one. Economic waste is involved in most plants in supplying steam or other heat for raising the temperature of the oil, while at the same time a cooling medium must be supplied for removing the heat from the vapors and denuded oil passing from the still. This is obviated in the present instance by the installation of economic waste heat exchange apparatus by means of which much of the heat to be removed from the denuded oil is transmitted to saturated oil, thereby effecting a saving of both the heating medium and the cooling medium.

One of the serious operating difficulties in absorption plants is the scaling of apparatus in which oil or vapors are cooled by means of water. The use of heat exchanging apparatus reduces this operating difficulty, due partly to the fact that less water cooled apparatus is required, but principally because the fluid to be cooled has been materially reduced in temperature before entering the water cooled apparatus. It has been found from actual experience that if the oil and vapors are reduced in temperature to 120° F. before entering the water cooled apparatus, objectionable scaling is eliminated, and with many waters a temperature of about 150° F. may be permitted without encountering objectionable scaling. This has been borne in mind in the present instance, as will be understood from a study of the flow plan of the plants here indicated in diagram, and as will be more fully understood as the operation of the invention is hereinafter set forth.

In operation of a typical plant embodying the invention it will be assumed that the temperature of the denuded oil is usually decreased from 220° F. to 120° F., while passing through the absorption plant, and that the saturated oil temperature increases from 80° F. to 180° F., during its flow through the absorption plant. These temperatures are in the present instance controlled by the flow arrangement through the various heat exchangers and condensers here shown. Referring to Fig. 1 of the drawings, by way of example, it will be assumed that denuded oil is delivered to the absorber 10 through pipe 12 at a temperature of 80° F., and that the saturated oil drawn off through pipe 13 is at a similar temperature. This saturated oil is then delivered to the heat exchanger 14, where it will, of course, enter at a temperature of 80° F., and due to the circulation of denuded oil passing through the same exchanger, it will leave this exchanger at a temperature of approximately 180° F. This oil then passes through the primary fractionating condenser 16, leaving this condenser at a temperature of approximately 210° F., at which temperature it is delivered to the still. In some instances it will be understood that the arrangement of heat exchangers and condensers may be varied, as for example, in the use of a plurality of heat exchangers, 14, or a plurality of oil intercoolers, such as 32 and 39, or the elimination of certain condensers, such as the primary fractionating condenser, 16, and the primary gasoline condenser, 24. Due to the delivery of steam to the vaporizing chamber of the still, the fluids within the still will have a temperature of approximately 220° F., at which temperature the oil will fall and the gasoline will pass off as a light vapor through pipe 21. The temperature of the gasoline will be approximately 220° F. A portion of this heat will be imparted to the counter flow of saturated oil passing through the condenser 16 to the still if this condenser is used. The cooling gasoline vapors will then pass successively to control condenser 22 and condenser 24 and 26, during which time the temperature will be lowered to approximately 80° F. While the gasoline vapors and condensate are passing through the condensers 22 and 24 there is a simultaneous counterflow of denuded oil through the opposite sides of these condensers. This oil was withdrawn from the still at a temperature of approximately 220° F., thereafter passed through the heat exchanger 14, where a part of its heat was imparted to the saturated oil flowing through this exchanger, thus lowering the temperature of the denuded oil to approximately 120° F., while raising the temperature of the saturated oil to approximately 180° F. The denuded oil then passes through intercooler 32, in which the cooling medium is preferably water.

Attention is directed to the fact that the temperature of the oil as it enters the intercooler is below the scaling point of water, thus making it possible to circulate water through the intercooler 32, delivering it at 75° F., and carrying it off at approximately 100° F., without scaling. The denuded oil will then have a temperature of approximately 90° F., and at this temperature will be circulated in a counter direction through the condensers 24 and 22, respectively. During this flow the temperature of the denuded oil will be again raised to approximately 120° F., at which temperature it will be delivered to the oil cooler 39. This oil cooler employs water as a cooling medium which is delivered at the normal temperature of approximately 75° F., and is withdrawn at a temperature of 100° F. By this time the denuded oil will have reached a temperature of 80° F., and will be in suitable condition for delivery to the absorber. Attention is directed to the fact that during all this circulation the gasoline vapors and condensate have been lowered to a temperature of 120° F., when they leave the condenser 24. This makes it possible for the final condenser 26 to use water as a cooling medium, without danger of scaling. Water is therefore delivered through pipe 28 at a temperature of 75° F., and withdrawn through pipe 29 at a temperature of 100° F. The final product passing from the condenser 26 will have a temperature of approximately 80° F. The control of the temperature is brought about to such a nicety in the present instance by regulating the flow of denuded oil through the condensers 22 and 24 by the control of by-pass valves 42 and 38. This regulation may be brought about by varying the amount of opening of the valves 38 and 42, so that the denuded oil passing from intercooler 32 and to control gasoline condenser 24 may be by-passed from pipe 35 to pipe 36 through valve 38 in a manner to decrease the velocity flow of denuded oil through gasoline condenser 24. The flow of oil through the fractionating condenser 22 may also be controlled by varying the opening of valve 42 to permit all or part of the oil flowing through pipe 36 to be circulated through the control condenser 22. In any event, the final product will be obtained by the use of a minimum amount of equipment permitting utilization of water as a cooling medium, and without danger of accumulation of scale in the water circulating conduits.

Assuming that oil is circulated at the rate of 100,000 pounds per hour and that the specific heat of the oil is approximately .5, two million B. t. u. would be required to increase the temperature of the saturated oil from the temperature at which it leaves the heat exchanger 14, namely 180° F., to the temperature of the still, viz: 220° F.

Assuming that 4000 pounds per hour of gasoline are vaporized and that steam is injected into the vapors at the rate of 2400 pounds per hour, the total heat required to reduce the temperature of the vapors from 220° F. to 120° F. is approximately three million B. t. u. If, therefore, the saturated oil were heated by the vapors in the vapor to oil exchanger to the still temperature, the temperature of the vapors would not be reduced to the desired 120° F. for delivery to a water cooled condenser. It would therefore be necessary to use water in comparatively high temperature vapor condensing apparatus, and scaling would surely result.

In absorption plants the condenser must always be divided into units, so that the characteristics of the gasoline produced may be controlled at will by regulation of the temperature in the final unit of the condenser. The condensate from the other units of the condenser is returned to the still.

Assuming that, in the use of the plant shown in the drawings, the same quantities of fluids as described above are circulated, then 1,500,000 B. t. u. would be removed from the vapors by heating the saturated oil from 180° F. to 210° F., the remaining 1,500,000 B. t. u. required to reduce the temperature of the vapors to 120° F. are removed by means of the denuded oil which I have previously cooled to say 90° F. I heat this denuded oil from 90° F. to say 120° F. in the vapor condensing apparatus and then pass it to the final oil coolers where its temperature is reduced to say 80° F.

It will thus be seen that the present invention makes it possible to utilize denuded oil as one of the cooling mediums in an absorption plant, and water as the other cooling medium, without requiring a circulation of an additional quantity of oil as a cooling medium, or without possibility of forming scale in the conduits through which the water circulates, thereby insuring an efficient operation of the plant at a reduced cost, and a desirable output of the produce to be obtained from the plant.

Having thus described my invention what I claim and desire to secure by Letters Patent is:

1. A method of recovering gasoline from casing head gas and the like, which consists in passing denuded absorption oil through an absorption tower in the presence of the gas, thereafter drawing off the saturated absorption oil and passing it through a heat exchanger, where its temperature is raised, and thereafter delivering said oil to a still, through which it flows while gaseous vapors are formed, then passing the denuded absorption oil drawn from the still through the heat exchanger to raise the temperature of the incoming saturated oil, thereafter passing the denuded oil through a primary gasoline condenser, where its temperature is raised, and then passing said oil through a control fractional condenser and returning the denuded absorption oil to the absorption tower, at the same time drawing off the gaseous vapors from the still and passing them in their highly heated condition through a primary fractionating condenser, where they will act to raise the temperature of the saturated oil passing from the heat exchanger to the still, after which the gaseous vapors pass through the fractionating control condenser, where a further transfer of heat will be made to the denuded oil passing from the primary gasoline condenser to the absorption tower and then passing the gaseous vapor through the primary gasoline condenser, while raising the temperature of the denuded oil passing from an oil intercooler where it is cooled and then passes to the control fractional condenser.

2. A method of producing gasoline from casing head gas and the like, which consists in delivering a denuded absorption oil to an absorption tower where it comes in intimate contact with the gas, thereafter drawing off the saturated absorption oil from the tower and delivering it to a still, during which flow said oil successively passes through a heat exchanger and a primary fractionating condenser, in the first of which its temperature is raised by a flow of oil drawn from the bottom of the still, and in the second of which its temperature is further raised by an exchange of heat from a gaseous vapor drawn off from the still, passing the gaseous vapor through a fractionating control condenser and a primary gasoline condenser and passing the denuded oil which has been drawn from the still and passed through the heat exchanger through the primary gasoline condenser and the control fractionating condenser in succession, thereafter further cooling said denuded oil and delivering the same to the absorption tower.

3. A method of producing gasoline from casing head gas and the like, which consists in delivering a denuded absorption oil to an absorption tower wherein it comes into intimate contact with the gas to be treated, thereafter drawing off the saturated absorption oil at a relatively low temperature, then delivering the saturated absorption oil to a still at a relatively high temperature, the saturated oil during its transit successively passing through a plurality of heat exchangers, through the first of which also passes the denuded oil drawn off from the still at a relatively high temperature, and through the second of which also passes the gaseous vapors drawn from the still at a relatively high temperature, thereafter passing gaseous vapors through a series of condensers, passing the denuded oil drawn from the first heat exchanger through a water cooled heat exchanger and the condensers in a counter-flow to the gaseous vapors whereby the gaseous vapors will be cooled and then passing said cooled vapors through a condenser.

4. A method of producing gasoline from casing head gas and the like, which consists in delivering a denuded absorption oil to an absorption tower wherein it comes into intimate contact with the gas to be treated, thereafter drawing off the saturated absorption oil at a relatively low temperature, then delivering the saturated absorption oil to a still at a relatively high temperature, the saturated oil during its transit successively passing through a plurality of heat exchangers, through the first of which also passes the denuded oil drawn off from the still at a relatively high temperature, and through the second of which also passes the gaseous vapors drawn from the still at a relatively high temperature, thereafter passing gaseous vapors through a series of condensers, passing the denuded oil drawn from the first heat exchanger through a water cooled heat exchanger and the condensers in a counter-flow to the gaseous vapors will be cooled, and then completing the condensation of the gas by passing it through a water cooled condenser.

5. A method of producing gasoline from casing head gas and the like, which consists in delivering a denuded absorption oil to an absorption tower wherein it comes into intimate contact with the gas to be treated, thereafter drawing off the saturated absorption oil at a relatively low temperature, then delivering the saturated absorption oil to a still at a relatively high temperature, the saturated oil during its transit successively passing through a plurality of heat exchangers, through the first of which also passes the denuded oil drawn off from the still at a relatively high temperature, and through the second of which also passes the gaseous vapors drawn from the still at a relatively high temperature, thereafter passing gaseous vapors through a series of condensers, passing the denuded oil drawn from the first heat exchanger through a water cooled heat exchanger and the condensers in a counter-flow to the gaseous vapors whereby the gaseous vapors will be cooled, and regulating the counter-flow of denuded oil to the condensers to bypass the oil around a condenser in a manner to obtain a desired cooling temperature in each of the condensers and finally condensing the vapors in a water-cooled condenser.

6. A method of producing gasoline from casing head gas and the like, which consists in delivering a denuded absorption oil to an absorption tower wherein it comes into intimate contact with the gas to be treated, thereafter drawing off the saturated absorption oil at a relatively low temperature, then delivering the saturated absorption oil to a still at a relatively high temperature, the saturated oil during its transit successively passing through a plurality of heat exchangers, through the first of which also passes the denuded oil drawn off from the still at a relatively high temperature, and through the second of which also passes the gaseous vapors drawn from the still at a relatively high temperature, thereafter passing the gaseous vapors through a series of condensers, and passing the denuded oil drawn from the first heat exchanger through a water cooled heat exchanger and the condensers in a counter-flow to the gaseous vapors whereby the gaseous vapors will be cooled, and then completing the condensation of the gas by passing it through a water cooled condenser, and passing the denuded oil from the condensers through coolers prior to the delivery of said denuded oil to the absorption tower.

7. A method of producing gasoline from casing head gas and the like, which consists in delivering a denuded absorption oil to an absorption tower wherein it comes into intimate contact with the gas to be treated, thereafter drawing off the saturated absorption oil at a relatively low temperature, then delivering the saturated absorption oil to a still at a relatively high temperature, the saturated oil during its transit successively passing through a plurality of heat exchangers, through the first of which also passes the denuded oil drawn off from the still at a relatively high temperature, and through the second of which also passes the gaseous vapors drawn from the still at a relatively high temperature, thereafter passing gaseous vapors through a series of condensers, and passing the denuded oil drawn from the first heat exchanger through a water cooled heat exchanger and the condensers in a counter-flow to the gaseous vapors whereby the gaseous vapors will be cooled, then finally condensing the vapors in a water-cooled condenser, the denuded oil passing through an intercooler prior to reaching the condensers.

8. A method of recovering gasoline from casing head gas, and the like, which consists in passing denuded oil through an absorption device in the presence of the gas, whereby saturated absorption oil of a relatively low temperature will be produced, thereafter passing said saturated oil through heat exchangers in which the temperature of said oil will be raised, then passing the oil into a still, where gaseous vapors will be produced, to be drawn from the still, and the saturated oil will thus be denuded; then passing said denuded oil, which is of relatively high temperature, through one of the heat exchangers through which the cooler saturated oil is flowing, whereby the temperature of the denuded oil will be lowered to a temperature approximately lower than the scaling point of water; then passing said denuded oil through a water cooler and thereafter passing the denuded oil through a control condenser while passing the gaseous vapors from the still through said condenser.

9. A method of recovering gasoline from casing head gas, and the like, which consists in passing denuded absorption oil through an absorption tower in the presence of the gas, thereafter drawing off the saturated absorption oil and passing it through a heat exchanger, where its temperature is raised; then delivering said heated saturated oil to a still through which it flows while gaseous vapors are being formed; then draining the denuded absorption oil from the still and passing it through the heat exchanger through which the incoming saturated oil is flowing, and in which exchanger the saturated oil will be heated and the denuded oil cooled to a temperature approximating that of the scaling point of water; then passing said denuded oil through a water cooler where its temperature is further lowered, thereafter passing said cooled denuded oil through a condenser in a counter current flow to that of the gaseous vapors passing from the still, whereby said vapors will be cooled, and then passing said oil through water condensers operating at a temperature approximating the scaling point of water, whereby the temperature of the denuded oil will be lowered, preparatory to its delivery to the absorption tower.

10. A method of absorption in which gasoline is recovered from natural gases, which consists in saturating a denuded menstruum in an absorber, thereafter carrying the saturated menstruum to a still where its vapors are given off at a relatively high temperature, and then condensing said vapors using water as a final cooling agent and employing the absorbing menstruum as an intermediate cooling agent between the still and the final vapor cooling water condenser at a temperature below the scaling temperature of the water.

11. A method of absorption in which gasoline is recovered from natural gases, which consists in saturating a denuded menstruum in an absorber, thereafter carrying said saturated menstruum to a still where its vapors are given off, then passing the denuded absorbing menstruum successively in heat exchange relationship to the saturated menstruum, and to water whereby the temperature of the denuded menstruum will be lowered without scaling of the water, thereafter using the cooled denuded menstruum as a cooling agent for the vapors given off from the still, and then recooling the denuded menstruum by passing it through an oil to water heat exchanger prior to redelivering it to the absorber.

CARL F. BRAUN.